US005895801A

United States Patent [19]

Lee

[11] Patent Number: 5,895,801
[45] Date of Patent: Apr. 20, 1999

[54] PRESSURE-SENSITIVE ADHESIVES FOR MARKING FILMS

[75] Inventor: Ivan S. Lee, Arcadia, Calif.

[73] Assignee: Avery Dennison Corporation, Pasadena, Calif.

[21] Appl. No.: 08/829,002

[22] Filed: Mar. 31, 1997

[51] Int. Cl.$^6$ .......................... C09J 151/04; C09J 151/00
[52] U.S. Cl. .......................... 525/301; 524/460; 523/201
[58] Field of Search ..................... 523/201; 524/460; 525/301

[56] References Cited

U.S. PATENT DOCUMENTS

| | | | |
|---|---|---|---|
| 3,248,356 | 4/1966 | Snyder | 260/29.6 |
| 4,371,659 | 2/1983 | Druschke et al. | 524/599 |
| 4,948,822 | 8/1990 | Iovine | 523/201 |
| 5,129,126 | 7/1992 | Huang | 24/3 |
| 5,164,444 | 11/1992 | Bernard | 524/833 |
| 5,264,532 | 11/1993 | Bernard | 526/261 |
| 5,278,227 | 1/1994 | Bernard | 524/817 |
| 5,405,879 | 4/1995 | Uemae | 523/201 |
| 5,550,181 | 8/1996 | Scholz | 524/460 |

FOREIGN PATENT DOCUMENTS

| | | | |
|---|---|---|---|
| 0037923 | 10/1981 | European Pat. Off. | |
| 0522791 | 1/1993 | European Pat. Off. | |
| 3544882 | 11/1986 | Germany | |
| 264077 | 11/1986 | Japan | 524/460 |
| WO9314161 | 7/1993 | WIPO | |
| WO9608320 | 3/1996 | WIPO | |

OTHER PUBLICATIONS

English–language translation of Japanese Patent No. 264,077 (Nov. 1986).

Primary Examiner—David Buttner
Attorney, Agent, or Firm—Christie, Parker & Hale, LLP

[57] ABSTRACT

Inherently tacky polymerized copolymer particles are formed by emulsion polymerization for use as an PSA for marking films. The adhesives are the reaction product formed by emulsion polymerization of a first monomer mixture comprising at least one alkyl acrylate containing from 4 to about 12 carbon atoms in the alkyl group, at least one hard monomer, and at least one unsaturated carboxylic acid containing from 3 to about 5 carbon atoms and present in a total amount of from about 3 to about 6% by weight of the first monomers which there is added by the reaction product of a second monomer system comprising at least one alkyl acrylate containing from 4 to about 12 carbon atoms in at least one unsaturated carboxylic acid monomer present containing from 3 to about 5 carbon atoms in present in a total amount from about 7 to about 10% by weight of the monomers, said second copolymer being substantially free of other hard monomers in which said first copolymer is present in an amount at least 50% by weight of the total copolymers and has a glass transition temperature from 0 to about −25° C. The second copolymer has a glass transition temperature of from about −25° C. The copolymers are preferentially formed by sequential polymerization.

21 Claims, 2 Drawing Sheets

PRESSURE-SENSITIVE ADHESIVES FOR MARKING FILMS

FIELD OF THE INVENTION

The present invention pertains to emulsion acrylic adhesives for use as adhesives for marking films.

BACKGROUND OF THE INVENTION

Marking films are recognized in the art as laminates of a self-supporting polymeric film facestock or backing such as polyvinyl chloride (PCV) and a layer of a pressure sensitive adhesive (PSA) for application to substrates, especially vertically oriented substrates. The exposed surface of the PSA of the laminate is in contact with a release liner or the surface of the facestock which is provided with a release coating. Marking films are manufactured in the form of large rolls of the laminate then cut to size depending on the application. Applications may range from automotive pin-stripping to large printed signs or individual indicia in the form of or containing letters, numbers, logos and the like.

There are many requirements for a laminate to be used for a marking film. A very important requirement is durability of the laminate of the polymeric film and adhesive for a period of months or years. The laminate of the polymeric film facestock and adhesive must remain functional for an expected period of time and after that period of time, the laminate must have retained the ability to be cleanly removed from the substrate without leaving an adhesive residue. Removal typically occurs with destruction of the facestock namely, where the facestock is no longer reusable. Accordingly, the adhesives are typically regarded more as "permanent" than as "removable".

Polyvinyl chloride films that have been used for marking the film application have varied in durability depending on service life. Short life vinyl films are used for promotional sign applications where an expected service life is six months to one year and if plasticized, the vinyl is typically film plasticized with a monomeric plasticizer. Cost is kept low by elimination of any primer or anchor and barrier layers. Medium and long life films are typically expected to have an useful life of up to about ten years and normally contain UV and heat stabilizing components and polymeric plasticizers. A primer may be employed to enhance anchorage of the pressure-sensitive adhesive to the film and a barrier layer may be employed to inhibit migration of plasticizer from the body of the film into the adhesive. The medium life films are generally calendered and have an expected service life of five years. Long life films are cast and have an expected service life of ten or more years. Vinyl films typically have a thickness of from about 1 to 5 mils, typically 2 to 3 mils.

The PSAs typically used for marking films have been solvent based adhesives. PSAs are typically regarded as "permanent" in the sense that an attempt is made to remove a laminate having a paper facestock from the substrate, tear of the facestock would occur. When used on a vinyl or other polymeric substrates, attempts at removal result in deformation of the facestock to the extent that it may not be reused. The preferred adhesives desirably have some degree of initial repositionability, when the laminate is first applied to the substrate. Repositionability of the laminate without deformation of the facestock ends as adhesion grows with time in consequence of molecular flow to conform to the substrate. Typically the bond to a substrate will increase as much as 100% from an initial peel strength of about 500 N/M after 10 to 15 minutes dwell on the substrate to about 600 to 700 N/M within 24 hours. The requirement that the adhesive provide sufficient bond such that the facestock is not reusable is an important characteristic to inhibit vandalism of applied signs and other indicia in the form of advertisements, labels, and the like.

Other properties must also be present. The PSA must have sufficient shear strength to resist flow under the load of a thick polymeric facestock, it must yield to shrinkage of the facestock without exposing the adhesive, and it must be resistant to adhesive shrinkage so as to avoid wrinkling of the facestock. For outdoor applications, the PSA must be water-resistant with minimal to no significant loss of adhesion. Examples of typical outdoor applications include where the PSA is provided as a marking film label on a container exposed to sea water under transoceanic shipping conditions or as a sign on public or private transportation in climates of high humidity or rainfall. Where the PSA is bonded to a transparent substrate such as glass, it is desirable that the PSA be clear or transparent and resist the whitening action of water.

Another PSA property important to the marking films applications of signs and labels to truck sidings and the like is its compatibility with the practice of spray-washing of the substrate with a surfactant solution, laying the laminate on the clean, wet substrate, and after positioning, squeegeing out the excess water. This presents the problem of water whitening, the resistance to which, as indicated, is important especially where the substrate is transparent. If water whitening occurs it must dissipate in a matter of a few hours.

In consequence of the significant requirements placed on these adhesives, particularly that of resistance to water, the adhesives currently used for marking film applications have been organic solvent-based. Organic solvents are known to be noxious to the senses and may be hazardous. In addition, they present environmental problems, all of which are avoided if the PSA is water-based, such as emulsion-based PSAs. PSAs are, however, notoriously water-sensitive and whiten in some instances by mere application of a drop of water. While some such as a 2-ethylhexyl acrylate-butyl acrylate-vinyl acetate emulsion copolymer, have been employed for general purpose short life marking film applications, there has not yet been proposed functional adhesives for medium and longer term marking film service applications. The present invention is, therefore, directed to water-resistant, i.e., resistant to water-whitening and water deterioration, PSAs where the carrier is water, and which, when employed in marking film label applications, will cleanly remove from the substrate even after many years of exposure to the elements.

SUMMARY OF THE INVENTION

There is provided, according to the present invention, particulate emulsion copolymers formed by sequential polymerization, which copolymers are inherently tacky, pressure-sensitive adhesives which form a permanent bond to a substrate but are removable from the substrate without leaving an adhesive residue even after years of exposure to the elements. Substrates include amongst others, metal, glass, and painted surfaces. Clean removal, i.e., removal without leaving a residue on the substrate is provided after five or more years exposure to the elements is predicted by weatherometer tests such as evaluation using Xenon arc aging in an Atlas Weather-o-meter where 2000 hrs exposure is the equivalent of five years.

The polymerized polymers particles are formed by emulsion polymerization of the first monomer charge comprising at least one alkyl acrylate containing from 4 to about 12 carbon atoms in the alkyl group, at least one hard monomer and at least one unsaturated carboxylic acid monomer containing from 3 to about 5 carbon atoms, said unsaturated carboxylic acid monomer being present in a total amount of from about 3 to about 6 percent by weight of the monomer forming the first.

This copolymer as described can then be combined with a second copolymer formed of at least one alkyl acrylate containing from 4 to about 12 carbon atoms in the alkyl group and at one unsaturated carboxylic acid monomer containing from 3 to about 5 carbon atoms present in a total amount of up to about 7 to about 10 percent by weight of the monomer forming the second copolymer, preferably about 8 percent by weight of the second copolymer. The second copolymer may or may not include hard monomers.

The first or core copolymer is present in at least about 50 percent by weight, preferably 60 percent by weight and more preferably about 90 percent by weight of the polymerized copolymers particles and is preferably internally cross-linked.

The two copolymers are preferentially formed by sequential polymerization.

BRIEF DESCRIPTION OF THE DRAWINGS

The attached drawings schematically illustrate the sequentially polymerized copolymers of this invention in comparison to a blend of copolymers particles wherein.

DETAILED DESCRIPTION

According to the present invention, there is provided a novel mixture inherently tacky emulsion copolymer particles formed by polymerization of two different monomer combination which aggressively bond a polymeric backing or facestock to a substrate for a period of years and yet remains removable from the substrate with attendant destruction or deformation of the facestock. Removal is clean, i.e., without leaving a perceptible adhesive residue. The mixture is preferably provided by sequential polymerization.

The polymerized copolymers comprise a first, copolymer comprised of at least one alkyl acrylate containing 4 to about 12 carbon atoms in the alkyl group, at least one hard monomer and at least one unsaturated carboxylic acid monomer containing from about 3 to about 5 carbon atoms. The first copolymer is preferably internally cross-linked and is present in an amount of at least 50%, preferably of at least 60% and more preferably, of about 90% by weight of the provided copolymers.

The first copolymer, is combined with a second copolymer formed by polymerization, a second monomer system comprised of at least one alkyl acrylate and of at least one unsaturated carboxylic acid present in a total amount of from about 7 to about 10% by weight of the copolymer, preferably about 8% by weight of the copolymer. The second or shell copolymer may or may not contain hard monomers. While the second or shell copolymer may be internally cross-linked, it is preferable to limit internal cross-linking to the core.

It is preferred that at least a portion of the copolymers and most preferably all be formed by sequential polymerization.

The product is a domain-type emulsion polymerizate in which the first or core particles form one domain and the second or shell copolymer forms a second domain which partially or continuously surrounds the core.

Figure 1:
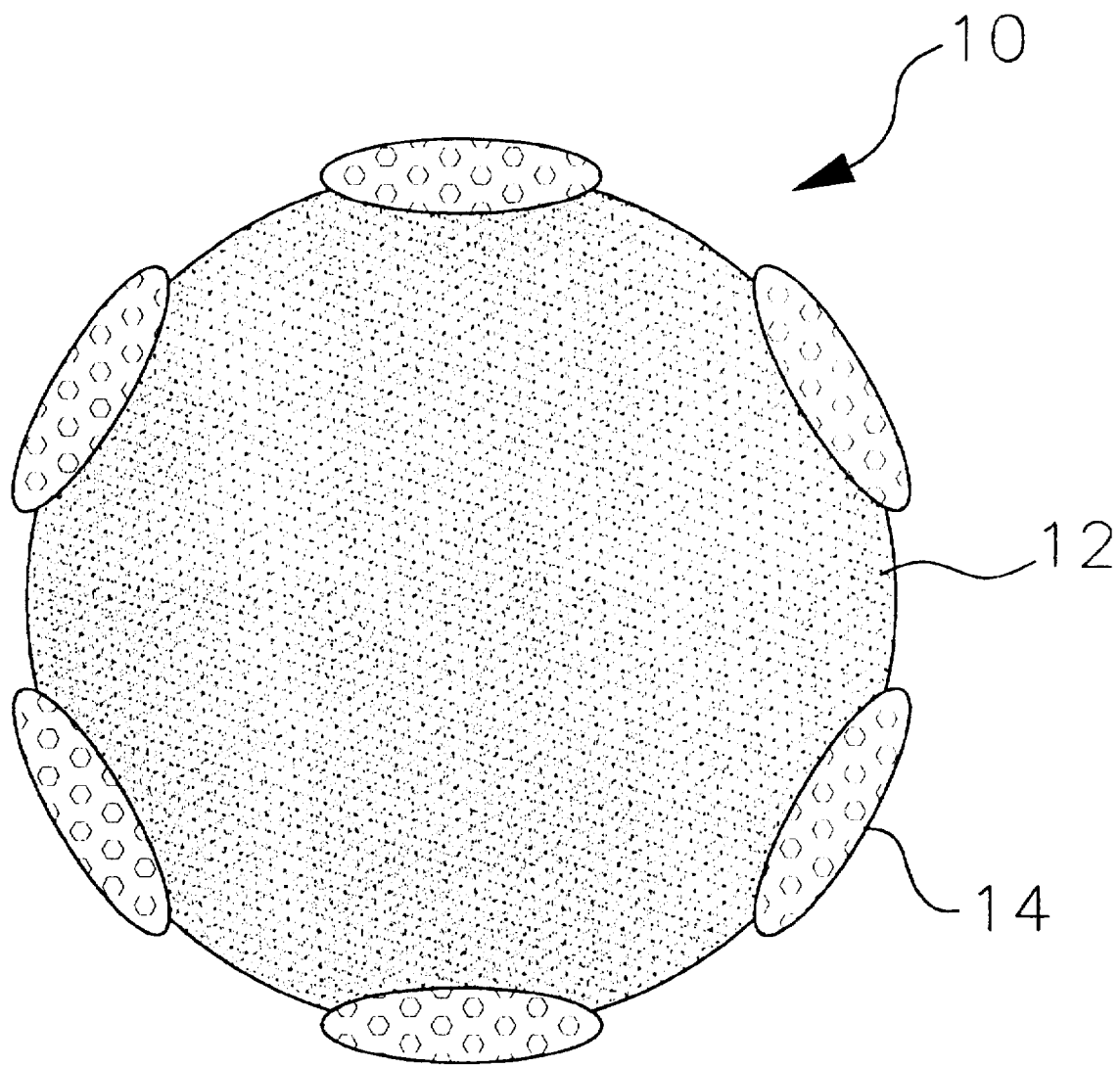
FIG. 1 depicts a sequentially polymerized copolymer particle.
Figure 2:
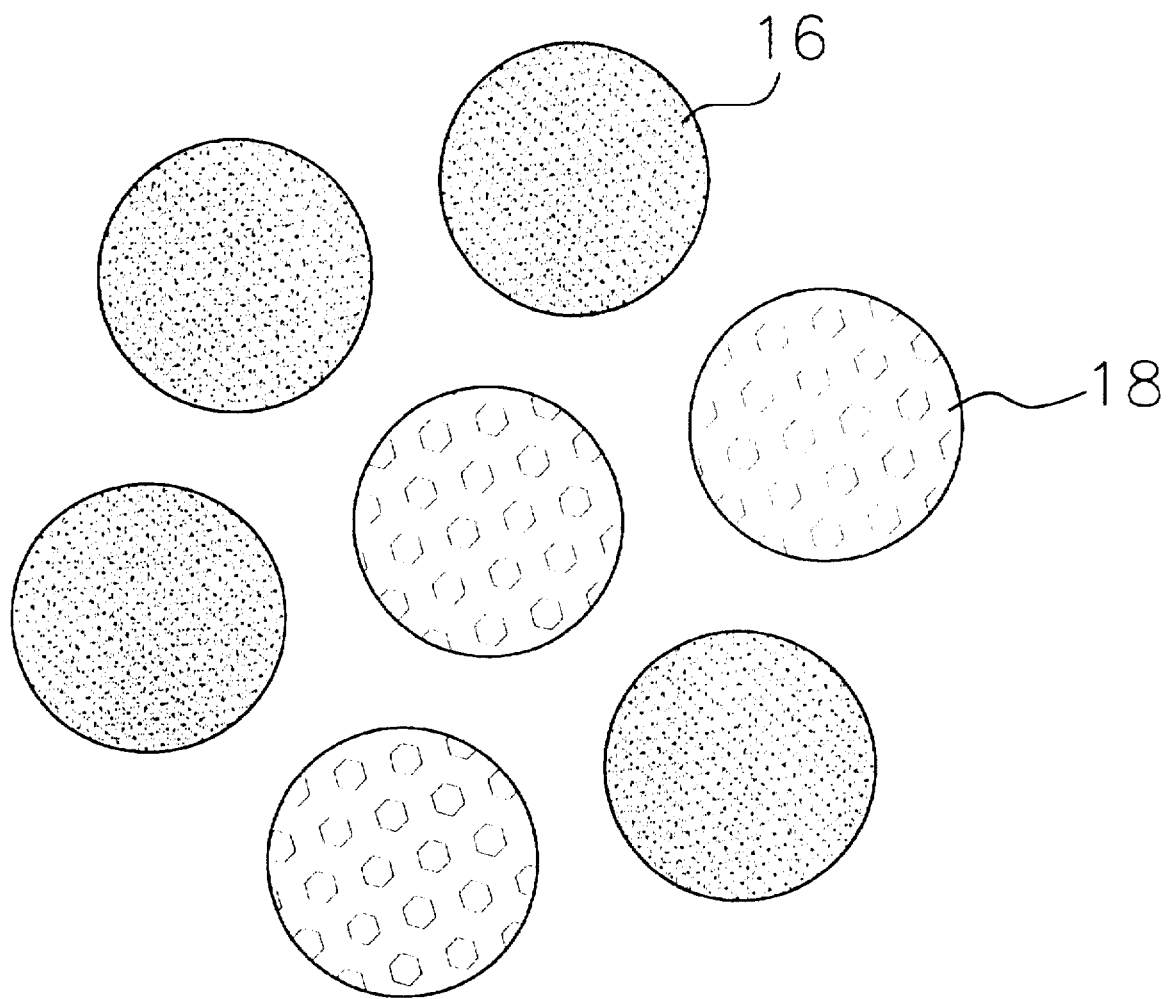
FIG. 2 depicts a mixture polymer particles forming the core particles and shell components of the sequentially polymerized copolymer.

The two systems are depicted to FIGS. 1 and 2. With reference to FIG. 1, a sequentially polymerized copolymer particle is formed in emulsion as particle 10 are comprised of a central domain 12 completely or partially surrounded by a second polymerized outer domains 14. In their formation, the inner domain is polymerized first, followed by polymerization of the monomers forming the outer domain which associates with and believed to attach to the initially formed inner copolymers.

As depicted in FIG. 2, if the individual copolymers are separately copolymerized and mixed, they form a random blend of core 16 and shell 18 copolymer particles with little or no attachment or association with each other.

There may, of course, be provided a mixture of subsequentially polymerized copolymers and individual first and second copolymers.

It has been found that the products of sequential polymerization generally provide demonstrably different PSA properties in comparison to a blend of individual components thereof.

One class of monomers used in forming the sequentially polymerized copolymers are alkyl acrylate monomers containing from 4 to about 12 carbon atoms in the alkyl group. The alkyl acrylate monomers that may be used include ethyl acrylate, butyl acrylate, propyl acrylate, 2-ethylhexyl acrylate, isooctyl acrylate, isodecyl acrylate, and the like. The presently preferred alkyl acrylate monomers are butyl acrylate and 2-ethylhexyl acrylate.

There is present one or more unsaturated carboxylic acids containing from 3 to about 5 carbon atoms, such as acrylic acid, methacrylic acid, itaconic acid and the like. The unsaturated carboxylic acids serve to impart cohesive strength, promote adhesion to polar surfaces and are present in a concentration of from about 3 to about 8% by weight of the copolymer, preferably of about 5% to about 6% by weight of the first or core emulsion copolymer and from about 7 to about 10%, preferably of about 8% by weight of the second or shell emulsion copolymer.

In the formation of the copolymer, the carboxylic acids employed are preferably a mixture of methacrylic acid and acrylic acid in which methacrylic acid is present in amounts of from 30 to about 50 percent by weight of the carboxylic acids with the balance being acrylic acid. The combination of carboxylic acid affects water resistance and can be used for clear and pigmented films.

The balance of the monomer system for the inner domain and if present the outer domain is comprised of hard monomers. Hard monomer content of the inner domain is from about 12 to 25% by weight of the monomers forming the inner domain copolymer.

Among the hard monomers are those having one or more vinyl esters containing from 2 to about 16 carbon atoms in the alkyl group. Representative vinyl esters include vinyl acetate, vinyl butyrate, vinyl propionate, vinyl isobutyrate, vinyl valerate, vinyl versitate, and the like. Vinyl acetate is preferred. There may also be mentioned styrenic monomers such as styrene, alpha methyl styrene and the like; alkyl methacrylates such as methyl methacrylate, ethyl methacrylate, butyl methacrylate and the like; and amides such as an n-isobutoxymethyl acrylamide and the like.

Other vinyl unsaturated monomers which aggressively copolymerize with the principal monomers may also be used to modify copolymer properties.

Other useful monomers which may be mentioned include diesters of dicarboxylic acids and mixtures thereof, in which each ester group of the diester independently contains from about 8 to about 16, preferably from about 8 to about 12, carbon atoms. The preferred diesters are di-2-ethylhexyl maleate (dioctyl maleate), di-2-ethylhexyl fumarate and mixtures thereof.

The acrylate of the copolymer inner domain is preferably 2 ethylhexyl acrylate (or isooctyl acrylate) alone or in a mixture with butyl acrylate. The alkyl acrylate of the second or shell copolymer is preferably butyl acrylate. While the inner domain may have a significant amount of a hard monomer such as vinyl acetate, the second or outer domain copolymer is preferably free of hard monomers other than the carboxylic acids. Including vinyl acetate in the first of the two sequentially polymerized copolymers, provides a relatively hard core having a glass transition temperature of from about 0° to about −25° C., preferably from about −5° to about −25° C., while the relatively soft second sequentially polymerized copolymer has a glass transition temperature below about −25° C. preferably of from about −25 to about −45° C. to provide molecular flow for "wet out."

The formed copolymers are generally free of hazing and whitening characteristics, and while they may initially whiten on application to the substrate, they clear with time as water diffuses through the adhesive film, and are cleanly removable from a substrate after a useful life of about one or even ten years or more.

The emulsion copolymers may be prepared in accordance with the present invention by polymerizing the monomers to yield a first or inner domain copolymer having a glass transition temperature (Tg) from about 0° C. to about −20° C., and a second or outer domain copolymer having a glass transition temperature below about −25° C., preferably from about −25% to about −45%.

Catalysts, such as potassium persulfate, tertiary butyl hydroperoxide and the like, and redox catalysts such as sodium meta-bisulfite and the like, are employed for polymerization and present in an amount of from about 0.15 to about 0.5 part by weight per 100 parts weight monomers with surfactant levels ranging from about 0.5 to about 5% by weight based on weight of the monomers being preferred. Reaction temperature generally ranges from about 65 to about 85° C.

There may be included "chain-transfer agents" by which there is meant organic compounds containing mono- or multi-mercaptan groups, chlorinated groups, hydroxy groups, and the like, as are known in the art. The presently preferred chain transfer agents are n-dodecyl mercaptan and t-dodecyl mercaptan provided in a concentration from about 0.01 to about 0.1% by weight of the monomers.

The first and if desired, the second copolymer may be cross-linked by use of an internal cross-linking agent. Internal crosslinking is intended to mean cross-links between chains as opposed to external cross-links which are between preformed emulsion particles. Internal crosslinking agents include polyfunctional compounds having at least two non-conjugated carbon-carbon double bonds per molecule which then become part of the polymer during polymerization. It has been found that the amount of internal crosslinking agents should not exceed about 3% by weight of the total monomer content as no additional benefit is typically observed at higher levels. Examples of suitable internal crosslinking agents include diallyl maleate, diallyl phthalate and multifunctional acrylates and methacrylates including polyethylene glycol diacrylate, hexanediol diacrylate, ethoxylated trimethylolpropane triacrylate, pentaerythritol triacrylate, propylene glycol diacrylate and trimethylolpropane trimethacrylate. The polymer composition may further comprise an external crosslinking agent to further modify adhesive properties which cause post polymerization crosslinking. External crosslinking agents include metal salts such as zirconium ammonium carbonate, zinc ammonium carbonate, aluminum acetate, zinc acetate and chromium acetate. The presently preferred external crosslinking agent is zirconium ammonium carbonate.

As indicated above, for the process of copolymer manufacture it is desirable to employ a surfactant system present in the amount of from about 0.5 to about 5 parts by weight to 100 parts by weight monomers, preferably about 3 parts per 100 parts by weight of the monomers. The presently preferred surfactant system is a combination of anionic surfactants. The presently preferred surfactant system is one employing 37.4% by weight of the ammonia salt of sulfated nonylphenoxypoly (ethyleneoxy) ethanol, 21.8% by weight of sodium dioctyl sulfosuccinate and 40.8% by weight sodium lauryl ether sulfate. The combination of anionic surfactants enables the formation of a stable suspension of the acrylic based emulsion copolymers of the invention.

One of the embodiments of the instant invention can be prepared to provide both a high cohesive strength and holding power to substrates and the ability to be removed from such substrates without leaving an adhesive residue even after a period of years.

The inclusion of multifunctional monomers such as tetramethylpropane triacrylate, tripropyleneglycol diacrylate and the like, enable the monomers to undergo internal cross linking reactions and allow chain transfer agents to control chain length. This differs from externally cross-linked polymer in that the functional groups, such as carboxyl, hydroxyl, and/or amino groups, remain free and available for improving adhesive properties available for external cross-linking reactions such as by exposure to actinic or electron beam radiation and/or through external cross-linking agents.

The following example illustrates the preparation of the best mode sequentially polymerized copolymers of the instant invention.

In the following Table 1, the following abbreviations have the meaning shown:

T.S.P.P.: tetracycline pyrophosphate

Aerosol OT-75: sodium dioctyl sulphosuccinate surfactant manufactured and sold by Cyanamid.

Trem LF-40: An anionic surfactant manufactured and sold by Henkel.

Disponil FES 77: sodium lauryl ether sulfate surfactant manufactured and sold by Henkel.

2EHA: 2-Ethylhexyl acrylate

BA: Butyl Acrylate

VAC: Vinyl Acetate

MAA: Methacrylic acid

AA: Acrylic Acid

TPGTA: Tripropylene glycol triacrylate

NDDM: n dodecyl mercaptan

K-persulfate: potassium persulfate

There was formed Soap Solution (1) and Soap Solution A(2) of the formulation tabulated in attached Table 1. Monomers in the proportions shown in column B(1) of Table 1 were added to Soap Solution (1) and the monomers of column B(2) were combined in Soap Solution (2). There was separately formed the catalyst solution C(3) and there was provided an initial reactor charge designated as charge D in Table 1. The charge was heated to 76° C. with agitation. After purging the reactor charge with nitrogen, the combined feed of the first grouping of monomers and the first soap solution was added with agitation while maintaining batch temperature between 70 and 82° C. After completion of the monomer pre-emulsion feed, it was allowed to continue for 15 minutes while holding the reactants at 78 to 80° C. There was then started feed of the second polymer emulsion, which contained the second grouping of monomers. After completion of the reaction there was added and 14% ammonia solution designated as (F) followed by defoamer (G) and biocide solutions (H). Deionized water (I) was added as necessary for viscosity control.

Table 2 describes the properties of the formed polymer using as a facestock polyvinyl chloride.

TABLE 1

|  | Parts by Weight | | | |
| --- | --- | --- | --- | --- |
|  | (1) | (2) | (1 + 2) | (1 + 2) Dry |
| A) Soap Solution | | | | |
| Di-ionized water | 139.73 | 41.33 | 181.06 | — |
| T.S.P.P. (59.7%) | 1.87 | 0.55 | 2.42 | 1.45 |
| Aerosol OT-75 (75%) | 3.30 | 0.97 | 4.27 | 3.20 |
| Trem LF 40 (40%) | 11.00 | 3.25 | 14.25 | 5.70 |
| Disponil FES 77 (32.5%) | 15.40 | 4.60 | 20.00 | 6.60 |
| B) Monomers | | | | |
| 2-EHA | 134.06 | — | 134.06 | 134.06 |
| BA | 422.84 | 189.10 | 611.94 | 611.94 |
| VAC | 105.00 | — | 105.00 | 105.00 |
| MAA | 12.60 | 6.60 | 19.20 | 19.20 |
| AA | 24.60 | 12.00 | 36.60 | 36.60 |
| TRPOTA | 10.50 | 2.20 | 12.70 | 12.70 |
| N-DDM | 0.40 | 0.10 | 0.50 | 0.50 |
| C) Catalyst Solution for Incremental Addition | | | | |
| Di-ionized Water |  | 97.00 | 97.00 | — |
| K-Persulfate |  | 3.00 | 3.00 | 3.00 |
| D) Initial Reactor Charge | | | | |
| Di-ionized Water |  | 414.30 | 414.30 | — |
| Disponil FES 77 (32.5%) |  | 3.40 | 3.40 | 1.11 |
| K-Persulfate |  | 2.30 | 2.30 | 2.30 |
| E) Catalyst Solution for Post Addition | | | | |
| Di-ionized Water |  | 2.50 | 2.50 | — |
| Disponil FES 77 (32.5%) |  | 0.10 | 0.10 | 0.03 |
| t-Butylhydroperoxide (75%) |  | 0.80 | 0.80 | 0.60 |
| F) 14% Ammonia Solution |  | 24.00 | 24.00 | — |
| G) Defoamer: Drewplus L-191 |  | 1.00 | 1.00 | 1.00 |
| H) Biocide: Kathon LX (1.5%) |  | 0.80 | 0.80 | 0.01 |
| I) Di-ionized Water |  | 28.80 | 28.80 | — |

TABLE 2

TYPICAL PHYSICAL AND ADHESIVE PROPERTIES OF ACRYLIC BASED EMULSION

A) PHYSICAL PROPERTIES:
 Appearance: translucent
 Grit: 50–100 ppm on 50 micron filter
 Total Solids: 54.0 +− 1.0% pH: 7.00 +− 0.5
 Viscosity: cps., #4 Spindle/30 rpm/25° C./LVT., 2,500–3,500
B) TYPICAL ADHESIVE PROPERTIES:
 180 Peel Adhesion N/M (lbs/in.), 20 minute dwell
 Stainless Steel 700–753 (4.0–4.3) Cl
 Glass 700–770 (4.0–4.4) Cl
 TNO 788–875 (4.5–5) Cl
 180 Peel Adhesion: N/M (lbs/in.), 24 hour dwell
 Stainless Steel 945.5–980.5 (5.4–5.6) Cl
 Glass 753–823 (4.3–4.7) Cl TABLE 2-continued

TYPICAL PHYSICAL AND ADHESIVE PROPERTIES OF ACRYLIC BASED EMULSION

TNO 988–1050 (5.7–6.0) Cl
 Loop Tack: NIM (lbs/in.),
 Glass 648–770 (3.7–4.0) Cl
 Shear Adhesion: minutes., ½" × ½"/500 gm/23° C./50% RH
 Stainless Steel 18,000 + ¹/₁₆" creep
 180 Peel Adhesion: N/M (lbs/in.), after 240 hours water immersion
 TNO 946–1050 (5.4–6.0) Cl
 Facestock: 440 clear vinyl (PVC)
 Release liner: Pre-siliconized release (E)
 Dry Coat Weight: gm/m²: 18 ± 1

TNO: Standard European painted panel
Cl: Clean Peel

What is claimed is:

1. An inherently tacky, pressure-sensitive adhesive composition useful for marking films, comprising first and second copolymers formed by sequential emulsion polymerization, wherein
 (a) the first copolymer is formed from a first monomer mixture comprising:
  (i) at least one alkyl acrylate containing from 4 to about 12 carbon atoms in the alkyl group;
  (ii) at least two unsaturated carboxylic acids present in a total amount of from about 3% to about 8% by weight of the first monomer mixture; and
  (iii) at least one hard monomer other than the at least two unsaturated carboxylic acids; and
 (b) the second copolymer is formed from a second monomer mixture comprising:
  (i) at least one alkyl acrylate containing from 4 to about 12 carbon atoms; and
  (ii) at least one unsaturated carboxylic acid;
wherein said first copolymer is present in an amount of at least 50% by weight of the copolymers and has a glass transition temperature from 0 to about −25° C., and said second copolymer has a glass transition temperature of less than about −25° C.

2. A composition as claimed in claim 1, wherein each of the at least two carboxylic acids in the first monomer mixture contains from 3 to about 5 carbon atoms.

3. A composition as claimed in claim 1, wherein the at least two carboxylic acids in the first monomer mixture are acrylic acid and methacrylic acid.

4. A composition as claimed in claim 3, wherein the methacrylic acid is present in the first monomer mixture an amount of from about 30 to about 50% by weight based on the total weight of the at least two carboxylic acids.

5. A composition as claimed in claim 1, wherein the second monomer mixture comprises at least two carboxylic acids.

6. A composition as claimed in claim 1, wherein each of the at least two carboxylic acids in the second monomer mixture contains from 3 to about 5 carbon atoms.

7. A composition as claimed in claim 6, wherein the at least two carboxylic acids in the second monomer mixture are acrylic acid and methacrylic acid.

8. A composition as claimed in claim 7, wherein the methacrylic acid is present in the second monomer mixture an amount of from about 30 to about 50% by weight based on the total weight of the at least two carboxylic acids.

9. A composition as claimed in claim 1, wherein the at least two carboxylic acids in the first monomer mixture are present in a total amount of from about 3% to about 6% by weight of the first monomer mixture.

10. A composition as claimed in claim 1, wherein the at least one carboxylic acid present in the second monomer mixture is present in a total amount of from about 7% to about 10% by weight of the second monomer mixture.

11. A composition as claimed in claim 1, wherein the first copolymer is present in an amount of at least about 60% by weight of the copolymers.

12. A composition as claimed in claim 1, wherein the first copolymer is present in an amount of at least about 90% by weight of the copolymers.

13. A composition as claimed in claim 1, wherein the at least one hard monomer is selected from the group consisting of vinyl esters and styrenic monomers.

14. A composition as claimed in claim 1, wherein the at least one hard monomer is styrene.

15. A composition as claimed in claim 1, wherein the at least one hard monomer is vinyl acetate.

16. A composition as claimed in claim 1, wherein the at least one alkyl acrylate in the first monomer mixture is selected from the group consisting of 2-ethylhexyl acrylate, isooctyl acrylate, butyl acrylate.

17. A composition as claimed in claim 1, wherein the at least one alkyl acrylate in the second monomer mixture is selected from the group consisting of 2-ethylhexyl acrylate, isooctyl acrylate, butyl acrylate.

18. A composition as claimed in claim 1, wherein the first copolymer is internally cross-linked.

19. A composition as claimed in claim 1, wherein the first monomer mixture further comprises a surfactant system.

20. A composition as claimed in claim 1, wherein the second monomer mixture further comprises a surfactant system.

21. An inherently tacky, pressure-sensitive adhesive composition useful for marking films, comprising first and second copolymers formed by sequential emulsion polymerization, wherein (a) the first copolymer is formed from a first monomer mixture comprising:
  (i) at least one alkyl acrylate containing from 4 to about 12 carbon atoms in the alkyl group;
  (ii) at least one unsaturated carboxylic acid present in a total amount of from about 3% to about 8% by weight of the first monomer mixture; and
  (iii) at least one hard monomer other than the at least two unsaturated carboxylic acids; and (b) the second copolymer is formed from a second monomer mixture comprising:
  (i) at least one alkyl acrylate containing from 4 to about 12 carbon atoms; and
  (ii) at least two unsaturated carboxylic acids;

wherein said first copolymer is present in an amount of at least 50% by weight of the copolymers, and said first copolymer has a glass transition temperature from 0 to about −25° C., and said second copolymer has a glass transition temperature of less than about −25° C.

* * * * *

UNITED STATES PATENT AND TRADEMARK OFFICE
CERTIFICATE OF CORRECTION

PATENT NO. : 5,895,801
DATED : April 20, 1999
INVENTOR(S) : Ivan S. P. Lee

It is certified that error appears in the above-identified patent and that said Letters Patent is hereby corrected as shown below:

Title page,
Item [73], replace "Ivan S. Lee" with -- Ivan S. P. Lee --.
ABSTRACT, line 2, replace "an PSA" with -- a PSA --.
Line 10, before "which" insert -- to --; and after "added" delete "by".
Line 13, replace "atoms in" with -- atoms and --.
Line 14, before "containing" delete "present"; and after "atoms" delete "in".

Column 1,
Line 20, replace "stripping" with -- striping --.
Line 42, replace "an useful" with -- a useful --.
Line 55, after "sense that" insert -- if --.
Line 57, before "vinyl" delete "a".

Column 2,
Line 62, after "elements" replace "is" with -- as --.
Line 66, replace "polymers particles" with -- polymer particles --.

Column 3,
Line 11, after "and at" insert -- least --.
Line 28, replace "copolymers" with -- copolymer --.
Line 40, replace "combination" with -- combinations --.
Line 42, replace "substrate with" with -- substrate without --.
Line 47, after "first" delete the comma.
Line 56, after "copolymer" delete "comma".

Column 4,
Line 5, replace "depicted to" with -- depicted in --.
Line 9, replace "domains" with -- domain --.
Line 12, before "believed" insert -- is --.

UNITED STATES PATENT AND TRADEMARK OFFICE
CERTIFICATE OF CORRECTION

PATENT NO.    : 5,895,801
DATED         : April 20, 1999
INVENTOR(S)   : Ivan S. P. Lee It is certified that error appears in the above-identified patent and that said Letters Patent is hereby corrected as shown below:

Column 7,
Line 12, after "added" delete "and".
Line 26, replace "Di-ionized" with -- Deionized --.
Line 35, replace "TRPOTA" with -- TRPGTA --.
Lines 38, 40, 44, 49, replace "Di-ionized" with -- Deionized -- (all occurrences).

Column 8,
Line 48, after "mixture insert -- in --.
Line 62, before "an amount" insert -- in --.

Signed and Sealed this

Sixteenth Day of April, 2002

Attest:

JAMES E. ROGAN
*Director of the United States Patent and Trademark Office*

*Attesting Officer*